United States Patent [19]

Tanaka et al.

[11] 4,291,098

[45] Sep. 22, 1981

[54] ORGANOALKOXYSILANE COATING COMPOSITIONS FOR PLASTIC ARTICLES

[75] Inventors: Mitsuaki Tanaka; Masaharu Suzuki, both of Kobe, Japan

[73] Assignees: Nippon Fine Chemical Co., Ltd.; Nippon Aspherical Lens Co., Ltd., both of Osaka, Japan

[21] Appl. No.: 110,744

[22] Filed: Jan. 9, 1980

[30] Foreign Application Priority Data

Jan. 22, 1979 [JP] Japan .................... 54-6654

[51] Int. Cl.$^3$ .................. B32B 27/36; B05D 3/02; C09D 3/82
[52] U.S. Cl. .................. 428/412; 260/31.2 R; 260/32.8 N; 260/33.2 EP; 260/33.4 EP; 260/33.6 EP; 264/1.7; 264/2.6; 351/166; 427/164; 427/167; 427/168; 427/169; 427/386; 428/413; 428/417; 428/447; 525/476
[58] Field of Search .............. 427/386, 387, 165, 164, 427/163, 168, 169, 167, 421, 439, 430.1; 428/412, 447, 413, 417; 264/1; 351/166; 528/94, 88, 118, 408; 525/476; 260/33.4 EP, 32.8 N, 33.2 EP, 33.6 EP, 31.2 R, 31.2 N

[56] References Cited

U.S. PATENT DOCUMENTS

| | | | |
|---|---|---|---|
| 3,170,890 | 2/1965 | Boyd et al. | 525/476 X |
| 3,682,687 | 8/1972 | Obuchi et al. | 427/386 |
| 3,894,881 | 7/1975 | Suzuki et al. | 106/287.16 |
| 4,056,208 | 11/1977 | Prejean | 427/386 X |
| 4,188,415 | 2/1980 | Humphrey, Jr. | 427/387 X |

FOREIGN PATENT DOCUMENTS

| | | | |
|---|---|---|---|
| 48/17880 | 6/1973 | Japan | 528/118 |
| 51/17299 | 2/1976 | Japan | 528/94 |
| 53/102999 | 9/1978 | Japan . | |

Primary Examiner—Michael R. Lusignan
Assistant Examiner—Thurman K. Page
Attorney, Agent, or Firm—Armstrong, Nikaido, Marmelstein & Kubovcik

[57] ABSTRACT

This invention provides a composition for coating plastics articles comprising (A) a hydrolyzed product of an organoalkoxysilane represented by the formula

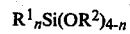

$$R^1{}_n Si(OR^2)_{4-n} \quad (I)$$

wherein $R^1$ is a saturated or unsaturated hydrocarbon residue having 1 to 4 carbon atoms, $R^2$ is a saturated hydrocarbon residue having 1 to 4 carbon atoms, and n is 0, 1 or 2, (B) an epoxy resin having an epoxy equivalent of about 120 to about 700, and (C) a bicyclic amidine represented by the formula

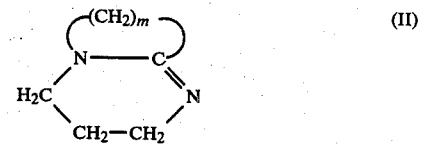

(II)

wherein m is 3 or 5, or a salt thereof; a method of coating plastics articles with use of the composition; and plastics articles having a cured coating of the composition.

14 Claims, No Drawings

ORGANOALKOXYSILANE COATING COMPOSITIONS FOR PLASTIC ARTICLES

This invention relates to coating compositions for plastics articles, especially those capable of forming protective coatings on plastics articles, a method of applying the compositions to articles, and articles coated with such compositions.

Plastics, especially polycarbonate resins and methacrylic resins, generally are lighter and have higher processability and impact resistance than inorganic glass and are therefore widely used, for example, for ophthalmic lenses, optical lenses, instrument covers, etc. However, these articles are low in surface hardness and susceptible to marring and have such low solvent resistance that they easily swell or dissolve when in contact with solvents. As a typical method of eliminating these drawbacks, it is known to form a cured organopolysiloxane coating on such articles. Organopolysiloxane coating compositions for forming the cured coating usually incorporate suitable curing catalysts, and alkali metal salts of organic carboxylic acids, such as sodium acetate, are widely used as catalysts. The coating compositions incorporating these catalysts nevertheless still involve difficulties in giving transparent cured coatings with sufficient hardness and abrasion resistance and further have the fatal drawback that they exhibit poor adhesion properties on plastics articles, especially on polycarbonate articles. Organopolysiloxane coating compositions have also been proposed which contain a cyclic amidine or salt thereof as the curing catalyst and which provide transparent coatings with high hardness and outstanding abrasion resistance, but difficulties are also encountered with these compositions in forming cured coatings on plastics articles, especially on polycarbonate articles, with improved adhesion. In fact, the cured coatings prepared from such coating compositions exhibit very low adhesion properties when subjected to hot water. For example, when the composition is applied to the surface of a polycarbonate article to form a cured coating thereon and the coated article is thereafter immersed in hot water at 80° C. for 30 minutes, the coating exhibits little or no adhesion properties. For application to polycarbonate articles, these known compositions therefore require a cumbersome procedure such as priming or like suitable pretreatment and are not usable satisfactorily.

An object of this invention is to provide coating compositions for forming protective coatings on plastics articles free of the drawbacks experienced with the known coating compositions.

Another object of the invention is to provide coating compositions for forming protective coatings directly on plastics articles, especially on polycarbonate articles, with outstanding adhesion and without necessitating the pretreatment.

Another object of the invention is to provide coating compositions capable of forming on plastics articles protective coatings having high hardness, outstanding abrasion resistance and excellent transparency.

Another object of the invention is to provide a method of forming directly on plastics articles protective coatings which are outstanding in adhesion, hardness, abrasion resistance and transparency.

Still another object of the invention is to provide plastics articles formed with protective coatings having the above-mentioned outstanding properties.

Other objects and futures of this invention will become apparent from the following description.

The present invention provides a composition for coating plastics articles comprising:

(A) 100 parts by weight of hydrolyzed product of an organoalkoxysilane represented by the formula $$R^1_n Si(OR^2)_{4-n} \quad (I)$$

wherein $R^1$ is a saturated or unsaturated hydrocarbon residue having 1 to 4 carbon atoms, $R^2$ is a saturated hydrocarbon residue having 1 to 4 carbon atoms, and n is 0, 1 or 2 (hereinafter referred to as "component A"), (B) about 1 to about 10 parts by weight of an epoxy resin having an epoxy equivalent of about 120 to about 700 (hereinafter referred to as "component B"), and (C) about 0.05 to about 5 parts by weight of a bicyclic amidine represented by the formula

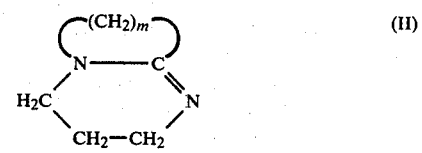

wherein m is 3 or 5, or a salt of the amidine (hereinafter referred to as "component C").

We have found that the coating compositions comprising the specified quantities of components A to C have the following outstanding characteristics. The present coating compositions, unlike the known organopolysiloxane coating compositions described, give cured coatings which exhibit remarkably improved adhesion properties on plastics articles, especially on polycarbonate articles. Accordingly the coating compositions of the invention are applicable directly to plastics substrates without necessitating the pretreatment, such as priming, that is required for the known coating compositions. The cured coatings retain the excellent adhesion properties free of any deterioration even after having been immersed in hot water at 80° C. for 30 minutes, and are durable for a prolonged period of time. The coatings formed on various plastics articles exhibit high hardness and outstanding abrasion resistance. Moreover the coating compositions give cured coatings having high transparency and sufficient resistance to solvents, etc.

These unique and remarkable features of the compositions of this invention appear attributable to the combination of the foregoing components A to C, and especially to the use of the component C which is considered to promote condensation and curing of the component A and also to accelerate curing of the component B, namely, epoxy resin, thus permitting these two components to cure simultaneously to form a coating. Thus when one of the components A, B and C is absent or replaced by other component, the desired composition is not obtainable. For example, compositions comprising the component A or B and the component C, or those comprising the components A and B in combination with sodium acetate or like conventional catalyst other than the component C are unable to afford coatings which are comparable to the compositions of this invention in adhesion and various other properties.

The present compositions are very useful for coating ophthalmic lenses, optical lenses, instrument covers and various other plastics articles. The compositions are best suited to polycarbonate articles since they exhibit especially high adhesion properties on polycarbonate resins which are widely used for ophthalmic lenses, etc. because of their lightness and high processability and impact resistance. Similarly the compositions give high adhesion protective coatings when applied to articles of other plastics, such as melamine-formaldehyde resins, methyl methacrylate resins, styrene resins, vinyl chloride resins, diallyl glycol carbonate resins, cellulose ester resins, etc.

The hydrolyzed products of organoalkoxysilanes useful as the component A of this invention can be easily prepared by the hydrolysis of the compounds represented by the formula (I). $R^1$ of the formula (I) includes alkyl having 1 to 4 carbon atoms such as methyl, ethyl, propyl, butyl, etc. and alkenyl having 1 to 4 carbon atoms such as vinyl, allyl, etc. Preferably $R^1$ is methyl, ethyl or vinyl; methyl is the most preferred. $R^2$ of the formula (I) includes alkyl having 1 to 4 carbon atoms such as methyl, ethyl, propyl, butyl, etc. Preferably $R^2$ is methyl or ethyl and most preferably is methyl. With n varying from 0 to 2, the organoalkoxysilanes of the formula (I) include tetrafunctional, trifunctional and bifunctional compounds. Examples of the tetrafunctional compounds are tetramethoxy silicon, tetraethoxy silicon, tetrapropoxy silicon, tetrabuthoxy silicon, etc. Examples of the trifunctional compounds are methyltrimethoxysilane, methyltriethoxysilane, vinyltriethoxysilane, vinyltrimethoxysilane, ethyltrimethoxysilane, ethyltriethoxysilane, n-propyltriethoxysilane, n-propyltrimethoxysilane, etc. Examples of the bifunctional compounds are dimethyldimethoxysilane, dimethyldiethoxysilane, etc. Especially preferable among these compounds are the trifunctional compounds of the formula (I) in which n is 1. It is also preferable to use such a trifunctional compound conjointly with a tetrafunctional compound in which n is 0 and/or a bifunctional compound in which n is 2. The most preferable organoalkoxysilane is methyltrimethoxysilane.

The hydrolysis of the organoalkoxysilanes of the formula (I) can be conducted usually by any of known processes. For example, the organoalkoxysilane is hydrolyzed typically by placing the compound into a suitable solvent, such as alcohol, ketone, ester or like polar solvent and stirring the mixture with addition of a mineral acid such as hydrochloric acid at a temperature of about 20° to about 25° C. for about 1 to about 2 hours.

According to this invention, it is critical to use as the component B epoxy resins having an epoxy equivalent of about 120 to about 700. Various known epoxy resins are usable which include, for example, bisphenol-type epoxides, phenol-type epoxides, polyglycol-type epoxides, ester-type epoxides, etc. Among these, especially preferable is the bisphenol-type epoxide prepared by the condensation of bisphenol A with epichlorohydrin. Those having an epoxy equivalent exceeding 700 are less compatible with the other components, especially with the component A and tend to give coatings which are white and less transparent or have reduced adhesion to substrates. Those lower than 120 are difficult to produce the contemplated effects, especially greatly improved adhesion to plastics articles. The epoxy equivalent is preferably about 150 to about 500, more preferably about 170 to about 300. The effects contemplated by this invention can be achieved by using the component B in an amount of about 1 to about 10 parts by weight, preferably about 1.5 to about 8 parts by weight, per 100 parts by weight of the component A. With less than 1 part by weight of the component B present, the effects to be produced by the use of said component are insufficient and the resulting coating has poor adhesion properties. Use of more than 10 parts by weight of the component B will not afford correspondingly improved adhesion properties but rather gives coatings of reduced abrasion resistance, hence undesirable.

The bicyclic amidines to be used as the component C in this invention are represented by the formula (II) and are 1,5-diazabicyclo(4,3,0)nonene-5 when m is 3 and 1,8-diazabicyclo(5,4,0)undecene-7 when m is 5. Examples of useful salts of these bicyclic amidines are inorganic acid salts such as nitrates, hydrochlorides, carbonates, etc., aromatic salts such as phenolates, benzoates, etc., aliphatic carboxylates such as acetates, lactates, acrylates, octylates, oleates, 2-ethylhexanoates, etc. Among these salts, 2-ethylhexanoates and like aliphatic carboxylate are most preferable and phenolates and like aromatic salts are also preferable. The component C is used in an amount of about 0.05 to about 5 parts, preferably about 0.1 to about 4 parts by weight, per 100 parts by weight of the component A. Amounts outside this range are not desirable, since the coatings obtained will have reduced adhesion properties.

The coating compositions of this invention comprise the specified amounts of the components A, B and C as dissolved in a suitable organic solvent and applied to plastics articles. The coating compositions are easily prepared, for example, by hydrolyzing the organoalkoxysilane of the formula (I) with an acid in a suitable organic solvent to form a solution of the component A and dissolving the components B and C in the solution. The compositions can be further diluted with a suitable organic solvent when so desired. Various organic solvents usually used for coating compositions of this type are usable. Exemplary of such solvents are lower alcohols, ketones, esters, cellosolves, lower carboxylic acids, and aromatic hydrocarbons. These include ethyl alcohol, propyl alcohol, butyl alcohol; methyl ethyl ketone, acetone, methyl isobutyl ketone; ethyl acetate, butyl acetate, carbitol acetate; methyl cellosolve, butyl cellosolve, phenyl cellosolve; acetic acid, propyonic acid; toluene, xylene, benzene, etc. These solvents are usable singly or in admixture, preferably in admixture. Especially preferable are mixtures consisting predominantly of the alcohols, esters or both of these two. The nonvolatile content of the coating compositions is about 10 to about 35%, although suitably variable in accordance with the method of application, etc. The preferable nonvolatile content is about 15 to about 30% and most preferably about 20 to about 25% by weight.

When desired, various known additives, such as gelation preventing agents, levelling agents, thickeners, coloring agents, etc. can be incorporated in desired amounts into the coating compositions of this invention. Typical gelation preventing agents are formic acid, acetic acid and like organic carboxylic acids. Examples of useful levelling agents are silicon surfactants such as a copolymer of lower alkylene oxide and lower dialkylsiloxane. Examples of useful thickeners are polyethylene oxide, polyvinyl butyral, etc. Various dyes and pigments are usable as coloring agents.

The coating compositions of this invention are applicable to plastics articles by usual methods as by immersion, spraying, etc. After application, the coating is cured easily by the usual method, namely, by heating the coated substrate at a temperature at which the substrate will not be thermally deformed. The heating temperature is usually at about 70° to about 150° C. when the article is made of the polycarbonate resin. The amount of present coating compositions to be applied to plastics articles, namely, the thickness of coatings is suitably determined in accordance with the contemplated use of the coated articles. The coatings for ophthalmic lenses, optical lenses and instrument covers may have a thickness of about 1 to about 5 µm. Such coatings have the desired properties such as sufficient abrasion resistance.

The present invention will be described below in greater detail with reference to examples and comparison examples.

EXAMPLE 1

(1) Preparation of solution of hydrolyzed product of methyltrimethoxysilane

Methyltrimethoxysilane (144.7 parts by weight) is slowly added dropwise to a mixture of 57.4 parts by weight of 0.02 N hydrochloric acid and 36 parts by weight of isopropyl alcohol at a temperature of 20° to 25° C. with stirring. After completion of the addition, the mixture is allowed to stand at room temperature for 1 hour, giving 238.1 parts by weight of a solution containing 100 parts by weight of hydrolyzed product of methyltrimethoxysilane.

(2) Preparation of coating composition of the invention

With the solution obtained above are admixed 3.3 parts by weight of bisphenol A epoxy resin (trade mark "EPIKOTE-827," product of Shell Chemical Co., having an epoxy equivalent of 180 to 190) and 0.3 part by weight of 1,8-diazabicyclo(5,4,0)undecene-7. To the resulting mixture is added a mixture composed of the following ingredients to prepare a coating composition (Specimen 1).

| Ingredients | Parts by weight |
| --- | --- |
| Acetic acid | 19.6 |
| n-Butyl acetate | 32.7 |
| Carbitol acetate | 16.4 |
| Xylene | 16.4 |
| Silicon surfactant | 0.3 |

EXAMPLE 2

A solution (238.1 parts by weight) of 100 parts by weight of hydrolyzed product of ethyltrimethoxysilane is prepared in the same manner as in Example 1 except that 50.0 parts by weight of 0.02 N hydrochloric acid, 49.1 parts by weight of isopropyl alcohol and 139.0 parts by weight of ethyltrimethoxysilane are used.

A coating composition (Specimen 2) is prepared from the solution in the same manner as in Example 1.

EXAMPLE 3

A solution (238.1 parts by weight) of 100 parts by weight of hydrolyzed product of vinyltrimethoxysilane is prepared in the same manner as in Example 1 except that 50.9 parts by weight of 0.02 N hydrochloric acid, 47.4 parts by weight of isopropyl alcohol and 139.8 parts by weight of vinyltrimethoxysilane are used.

A coating composition (Specimen 3) is prepared from the solution in the same manner as in Example 1.

EXAMPLE 4

A coating composition (Specimen 4) is prepared in the same manner as in Example 1 except that the solvent mixture is replaced by a mixture composed of the following ingredients.

| Ingredients | Parts by weight |
| --- | --- |
| Acetic acid | 6.5 |
| Ethanol | 60.0 |
| Toluene | 18.6 |

EXAMPLE 5

A coating composition (Specimen 5) is prepared in the same manner as in Example 1 except that 1.3 parts by weight of polyvinyl butyral (trade mark "SLEC BL-1," product of Sekisui Chemical Co., Ltd., Japan) is added to the solvent mixture used in Example 1.

EXAMPLES 6 AND 7

Coating compositions (Specimens 6 and 7) are prepared in the same manner as in Example 1 except that 1.5 parts by weight and 6.0 parts by weight, respectively, of "EPIKOTE-827" are used.

EXAMPLES 8 TO 10

Coating compositions (Specimens 8, 9 and 10) are prepared in the same manner as in Example 1 except that 0.1, 2.0 and 4.0 parts by weight, respectively, of 1,8-diazabicyclo(5,4,0)undecene-7 are used.

EXAMPLE 11

A coating composition (Specimen 11) is prepared in the same manner as in Example 1 except that 1,8-diazabicyclo(5,4,0)undecene-7 is replaced by 0.3 part by weight of 2-ethylhexanoate of this compound.

EXAMPLES 12 TO 14

Coating compositions (Specimens 12, 13 and 14) are prepared in the same manner as in Example 1 except that 3.3 parts by weight of "EPIKOTE-827" is replaced by 5.0 parts by weight of polyglycol epoxy resin (trade mark "DENACOL EX-314," product of Nagase Sangyo Co., Ltd., Japan, having an epoxy equivalent of 150), 2.0 parts by weight of bisphenol A epoxy resin (trade mark "EPIKOTE-1001," product of Shell Chemical Co., having an epoxy equivalent of 450 to 500) and 1.0 parts by weight of ester epoxy resin (trade mark "EPOTOHTO YD-172," product of Toto Kasei Co., Ltd., Japan, having an epoxy equivalent of 600 to 700) are used respectively.

COMPARISON EXAMPLE 1

A coating composition (Comparison Specimen I) is prepared in the same manner as in Example 1 except that no epoxy resin is used.

COMPARISON EXAMPLE 2

A coating composition (Comparison Specimen II) is prepared in the same manner as in Example 1 except that 0.5 part by weight of the epoxy resin is used.

COMPARISON EXAMPLE 3

A coating composition (Comparison Specimen III) is prepared in the same manner as in Example 1 except that 1,8-diazabicyclo(5,4,0)undecene-7 is replaced by 0.4 part by weight of sodium acetate.

COMPARISON EXAMPLE 4

The procedure of Example 1 is repeated except that the epoxy resin is replaced by 1.0 part by weight of epoxy resin (trade mark "EPIKOTE-1004," product of Shell Chemical Co., having an epoxy equivalent of 875 to 975). The resulting composition is not homogeneous nor transparent because of poor compatibility and is not usable for coating. Similarly a coating composition (Comparison Example IV) is prepared with use of 0.5 part by weight of "EPIKOTE-1004."

EXAMPLES 15 TO 28

A lens-shaped substrate injection-molded from a polycarbonate resin (trade mark "PANLITE," product of Teijin Kasei Co., Ltd., Japan), 80 mm in diameter and 2 mm in thickness, is coated with Specimen 1 by immersing the substrate into the specimen and withdrawing the same therefrom at a rate of 20 cm/minute and at 20° C. and 65% RH. Thereafter the coated substrate is heated for curing in a hot air dryer at 130° C. for 2 hours. The same procedure as above is repeated with use of Specimens 2 to 14, respectively.

The protective coatings thus formed are tested for properties by the following methods.

(a) Abrasion resistance

The coating surface is rubbed with steel wool (No. 000) and checked for susceptibility to scratching. The abrasion resistance is evaluated according to the following criteria:

A: No scratches when rubbed strongly.
B: Scratched when rubbed strongly.

(b) Adhesion

The coating is cut through to the substrate with a knife to form 100 squares of 1 mm×1 mm. A piece of cellophane adhesive tape (trade mark "CELLOTAPE," product of Nichiban Co., Ltd., Japan) is firmly pressed into contact with the cut surface and then rapidly peeled off the surface at a right angle thereto. The adhesion is evaluated in terms of the number of the squares remaining on the substrate.

(c) Adhesion after immersion in hot water

The coated substrate is immersed in hot water at 80° C. for 30 minutes, thereafter withdrawn from the water and tested in the same manner as above (b).

The results are shown in Table 1.

COMPARISON EXAMPLES 5 TO 8

The same procedure as in Example 15 is repeated with use of Comparison Specimens I to IV, respectively. The results are shown in Table 1 below.

TABLE 1

| Example | Specimen | Abrasion resistance | Adhesion | Adhesion after immersion in hot water |
|---|---|---|---|---|
| 15 | 1 | A | 100 | 100 |
| 16 | 2 | A | 100 | 100 |
| 17 | 3 | A | 100 | 100 |
| 18 | 4 | A | 100 | 100 |
| 19 | 5 | A | 100 | 100 |
| 20 | 6 | A | 100 | 72 |
| 21 | 7 | A | 100 | 100 |
| 22 | 8 | A | 100 | 100 |
| 23 | 9 | A | 100 | 100 |
| 24 | 10 | A | 100 | 100 |
| 25 | 11 | A | 100 | 100 |
| 26 | 12 | A | 100 | 84 |
| 27 | 13 | A | 100 | 75 |
| 28 | 14 | A | 100 | 68 |
| Comp. Ex. 5 | Comparison I | B | 58 | 0 |
| 6 | II | B | 62 | 0 |
| 7 | III | B | 100 | 0 |
| 8 | IV | B | 66 | 0 |

The results shown in Table 1 reveal that the coating compositions of this invention comprising the specified quantities of the components A to C form on polycarbonate resin coatings with high abrasion resistance and good adhesion without necessitating any pretreatment or priming.

The coatings prepared from Specimens 1 to 14 according to this invention are all transparent and glossy, exhibit no change in appearance even after the adhesion test in hot water and have high resistance to solvents.

We claim:

1. A composition for coating plastics articles comprising (A) 100 parts by weight of hydrolyzed product of an organoalkoxysilane represented by the formula $$R^1{}_n Si(OR^2)_{4-n} \quad (I)$$

wherein $R^1$ is a saturated or unsaturated hydrocarbon residue having 1 to 4 carbon atoms, $R^2$ is a saturated hydrocarbon residue having 1 to 4 carbon atoms, and n is 0, 1 or 2, (B) about 1 to about 10 parts by weight of an epoxy resin having an epoxy equivalent of about 120 to about 700, and (C) about 0.05 to about 5 parts by weight of a bicyclic amidine represented by the formula

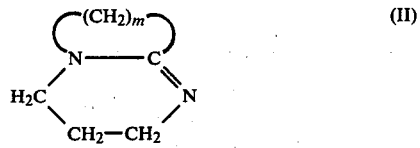

(II)

wherein m is 3 or 5, or a salt thereof.

2. A composition as defined in claim 1 wherein the organoalkoxysilane is represented by the formula (I) in which $R^1$ is alkyl having 1 to 4 carbon atoms or alkenyl having 1 to 4 carbon atoms, $R^2$ is alkyl having 1 to 4 carbon atoms and n is 1.

3. A composition as defined in claim 2 wherein the organoalkoxysilane is represented by the formula (I) in which $R^1$ is methyl, ethyl or vinyl, $R^2$ is methyl or ethyl and n is 1.

4. A composition as defined in claim 3 wherein the organoalkoxysilane is methyltrimethoxysilane.

5. A composition as defined in claim 1 wherein the epoxy resin has an epoxy equivalent of about 150 to about 500.

6. A composition as defined in claim 5 wherein the epoxy resin has an epoxy equivalent of about 170 to about 300.

7. A composition as defined in claim 1 wherein the epoxy resin is of the bisphenol type.

8. A composition as defined in claim 1 wherein the epoxy resin is used in an amount of about 1.5 to about 8 parts by weight per 100 parts by weight of the hydrolyzed product.

9. A composition as defined in claim 1 wherein the bicyclic amidine or a salt thereof is used in an amount of about 0.1 to about 4 parts by weight per 100 parts by weight of hydrolyzed product.

10. A composition as defined in claim 1 which is in the form of an organic solvent solution.

11. A method of coating a plastics article comprising applying a composition to the surface of the plastics article and forming a cured coating of the composition thereon, the composition comprising
(A) 100 parts by weight of hydrolyzed product of an organoalkoxysilane represented by the formula $$R^1{}_n Si(OR^2)_{4-n} \qquad (I)$$

wherein $R^1$ is a saturated or unsaturated hydrocarbon residue having 1 to 4 carbon atoms, $R^2$ is a saturated hydrocarbon residue having 1 to 4 carbon atoms, and n is 0, 1 or 2,
(B) about 1 to about 10 parts by weight of an epoxy resin having an epoxy equivalent of about 120 to about 700, and
(C) about 0.05 to about 5 parts by weight of a bicyclic amidine represented by the formula

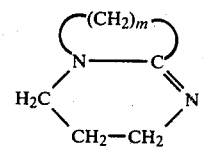

(II)

wherein m is 3 or 5, or a salt thereof.

12. A method as defined in claim 11 wherein the plastics article is made of a polycarbonate resin.

13. A method as defined in claim 11 wherein the composition is applied in the form of an organic solvent solution to the plastics article and then heated at a temperature of about 70° to about 150° C.

14. A plastics article having a cured coating of a composition comprising
(A) 100 parts by weight of hydrolyzed product of an organoalkoxysilane represented by the formula $$R^1{}_n Si(OR^2)_{4-n} \qquad (I)$$

wherein $R^1$ is a saturated or unsaturated hydrocarbon residue having 1 to 4 carbon atoms, $R^2$ is a saturated hydrocarbon residue having 1 to 4 carbon atoms, and n is 0, 1 or 2,
(B) about 1 to about 10 parts by weight of an epoxy resin having an epoxy equivalent of about 120 to about 700, and
(C) about 0.05 to about 5 parts by weight of a bicyclic amidine represented by the formula

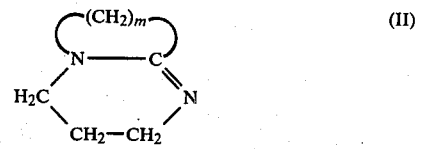

(II)

wherein m is 3 or 5, or a salt thereof.

* * * * *